United States Patent

Cross

[11] Patent Number: 5,519,959
[45] Date of Patent: May 28, 1996

[54] MOUNTING BASE FOR FISHING ROD HOLDER

[76] Inventor: Daniel J. Cross, Rte. 1, Box 282-B, Bealeton, Va. 22712

[21] Appl. No.: 288,350

[22] Filed: Aug. 10, 1994

[51] Int. Cl.$^6$ ................................................. A01K 97/10
[52] U.S. Cl. .................... 43/21.2; 248/538; 403/327
[58] Field of Search ........................... 43/21.2; 114/255; 248/511, 519, 538; 403/327

[56] References Cited

U.S. PATENT DOCUMENTS

| | | | |
|---|---|---|---|
| 213,226 | 3/1879 | McDermott et al. | 403/327 |
| 691,050 | 1/1902 | Dronne | 403/327 |
| 2,553,835 | 5/1951 | Sachs | 403/327 |
| 2,981,510 | 4/1961 | Burns | 248/538 |
| 3,063,668 | 11/1962 | Yohe | 43/21.2 |
| 3,366,406 | 1/1968 | Morris | 403/327 |
| 3,470,648 | 10/1969 | Bowker | 43/21.2 |
| 3,570,793 | 3/1971 | Shackel | 43/21.2 |
| 3,802,652 | 4/1974 | Holton | 43/21.2 |
| 4,367,971 | 1/1983 | Coren | 403/327 |
| 4,823,723 | 4/1989 | Brooks | 43/21.2 |

*Primary Examiner*—Kurt Rowan
*Attorney, Agent, or Firm*—Harold H. Dutton, Jr.; W. Charles L. Jamison; Diane F. Liebman

[57] ABSTRACT

A mounting base for removably securing the base portion of a fishing rod holder to a boat having a rope cleat thereon and including a mounting plate for receiving the base portion and a sole plate extending therefrom, the sole plate having a recess formed therein, a movable detent secured in the recess, a spring acting on the sole plate and the detent member so as to cause the detent to normally project above the surface of the sole plate for securing the mounting plate in position beneath a rope cleat while enabling the detent member to be depressed against the urging of the spring to a point at or beneath the surface of the sole plate and thereby enable withdrawal of the mounting base from beneath the rope cleat.

7 Claims, 1 Drawing Sheet

U.S. Patent
May 28, 1996
5,519,959
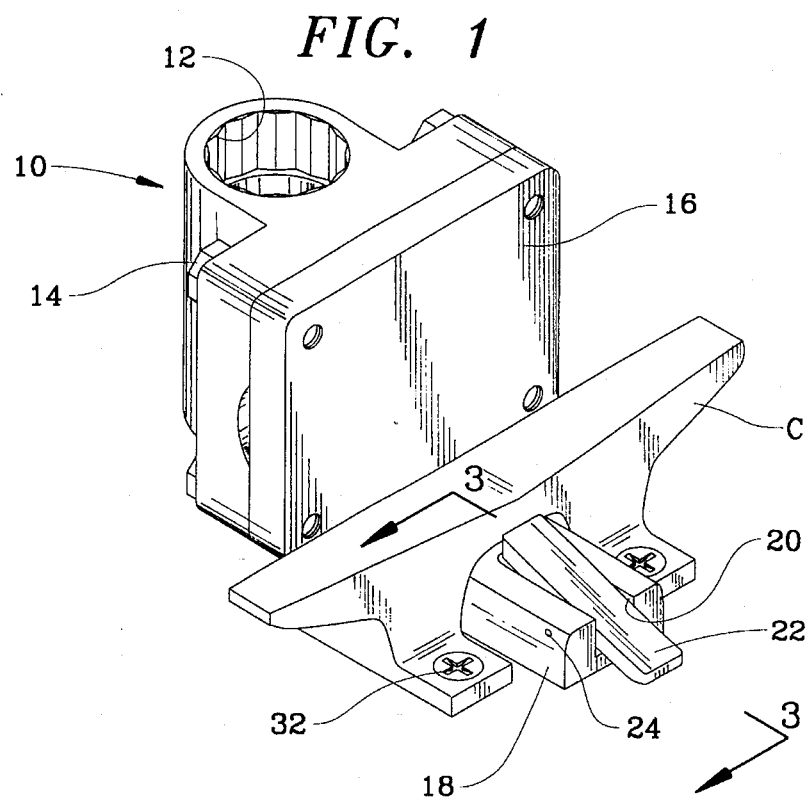
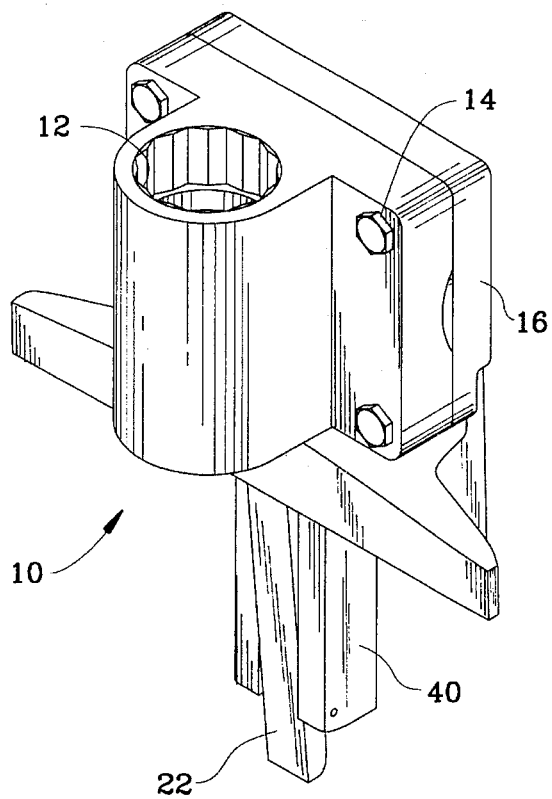
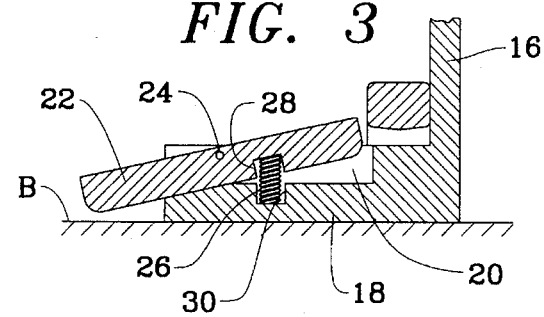

MOUNTING BASE FOR FISHING ROD HOLDER

This invention relates to an improved mounting base for fishing rod holders. More particularly, the invention relates to an improved mounting base device for removably attaching fishing rod holders to boats.

BACKGROUND AND OBJECTS OF THE INVENTION

A great many of devices have been developed in the prior art for serving as a fishing rod holder. Many of these devices are particularly adapted for use in holding fishing rods in a secure position on a boat during either trolling or still fishing. Of course rod holders must securely hold a fishing rod so that the rod cannot be pulled from the holder by a striking fish, or when a trolled lure strikes an obstruction. Such rod holder devices also need to be securely fastened to the boat, so that, once again, a fish striking a lure attached to a rod will not pull the rod and the rod holder from the boat.

For the sake of convenience, most rod holders currently available are two-part devices, in which a first part is permanently fastened to a boat, and a second part actually receives and holds the fishing rod, and is removably connected with the first part. Examples of such fishing rod holders are shown in U.S. Pat. Nos. 5,231,785 issued Aug. 3, 1993, 5,014,458 issued May 14, 1991, 5,184,797 issued Feb. 9, 1993, 3,792,829 issued Feb. 19, 1974. While such rod holders are quite effective and serve their purpose quite well, the base part which is secured to the boat presents something of a problem since it remains in place, even when it is not being used.

Many boats are used as dual purpose boats, both for fishing and for recreational purposes. But, when the boat is being used for recreation, i.e. water skiing, the base portion of the rod holder remains in place in the boat. Often the base is in the way of the persons in the boat. Removing the base portion is somewhat time-consuming and inconvenient, as one must remove the attaching screws used to fasten the base, and of course this leaves unsightly screw holes in the deck of the boat.

Likewise, when the boat is sold, either the rod holders must be removed, leaving the unsightly screw holes, or the rod holders must be sold with the boat.

Accordingly a primary object of the invention is to provide an improved fishing rod holder mount.

Another object of this invention is to provide a mount for fishing rod holders which is secure but quickly removable from the boat.

Still another object of the invention is to provide a mount for fishing rod holders which does not require drilling screw holes into the boat in order to just attach the rod holder.

Yet another object of the invention is to use an existing device found on most boats for securely attaching a rod holder to the boat.

A further object of the invention is to provide a mounting base for fishing rod holders which can be quickly attached to or removed from a rope cleat.

Still a further object of the invention is to provide a fishing rod holder mounting base which can be used with rope cleats mounted on either a horizontal or a vertical boat surface.

DESCRIPTION OF THE DRAWINGS

These and other objects and advantages of the invention will become apparent from the following specification and claims, when taken together with the accompanying drawings, which show by way of non-limiting example, one preferred embodiment of the invention, and in which:

FIG. 1 is a perspective view of a fishing rod holder mount for use with a boat cleat attached to a horizontal surface;

FIG. 2 is a perspective view of a fishing rod holder mount for use with a boat cleat attached to a vertical surface; and FIG. 3 is a fragmentary cross-sectional view along lines 3—3 of FIG. 1 and viewed in the direction of the arrows.

DESCRIPTION OF THE INVENTION

The present invention comprises a mounting base which is used to quickly and easily secure the base portion of a rod holder to a boat. This is mounting base is securely fastened to the base portion of the rod holder, and is provided with an extending sole portion adapted to rest against a surface of the deck of a boat. The sole portion includes a spring biased projection or detent which retractably projects above the sole portion.

Applicant has noticed that a great majority of rope cleats conventionally mounted on both fishing and pleasure boats have an open passageway between the two legs of the cleat which are bolted or screwed to the deck surface of the boat. This passageway in some cases facilitates attaching a rope to the cleat, but is not generally used except when the boat is docked. According to the invention, the extending sole portion of the mounting base projects sufficiently that the mounting base, and thus the boat-mounted portion of the rod holder, may be inserted into this opening in the cleat. After insertion, the detent then holds the mounting base in position beneath the rope cleat. Generally such rope cleats are securely attached to the boat, either on a horizontal or a vertical surface of the deck, and the attachment is such as to withstand movement of the boat against the holding of a rope tied to the cleat. Thus, the cleat mounting is generally more than sufficiently strong to hold a rod holder.

The spring biased projection or detent may be configured in such a manner that it is automatically depressed as the mounting base and rod holder are inserted beneath the cleat, and whereby the user need simply depress the detent to permit easy removal from the boat, without the use of any tools.

The mounting base is adaptable to either horizontal- or vertical-surface mounted cleats. Further, the full range of adjustment provided in most rod holders remains fully useable when used with the present mounting base.

While the mounting base is particularly adapted for use with fishing rod holders, the mounting base may also be used to removably attach other equipment onto boats, such as depth finders, boat bumpers, boat ladders, or the like.

DETAILED DESCRIPTION OF PREFERRED EMBODIMENTS

Referring to FIGS. 1 and 3, the invention will be described as being used with a rod holder such as that disclosed in U.S. Pat. No. 5,231,785, although it will be clear that it can be used with many other types of rod holders.

A conventional rod holder assembly includes a base portion generally designated 10 which includes a socket 12 for receiving a second, holster portion (not shown) into which a fishing rod is placed. This second or holster portion is inserted into the socket 12 during use.

Instead of being bolted to a boat, the base portion 10 is fastened by screws 14 to the mounting base plate 16. This mounting base 16 is provided with a sole plate 18 extending therefrom at a generally right angle. A recess 20 is provided in the sole plate 18, and houses a detent member 22 which is pivotally secured in the recess 20 by a pivot pin 24. A spring member 26 is housed in annular recesses 28 and 30 formed respectively in the sole plate 18 and the detent member 22.

The invention is particularly adapted for use with a conventional boat cleat such as that shown at C. Ordinarily such cleats are attached to the deck of a boat B by means of screws such as shown at 32.

In use, the mounting base 16 with the base portion attached of the rod holder is secured in position on the deck of the boat by inserting the sole plate 18 beneath the rope cleat C. As the base is inserted, the detent 22 is tilted slightly compressing the spring 26, until the tent passes completely beneath the cleat C. Then, the detent is pushed away from the sole plate to the position shown, whereby the rod holder is securely held in place.

To remove the rod holder, the user need merely depress the detent 22 and withdraw the sole plate from beneath the cleat.

The embodiment shown in FIG. 2 functions in the same manner, except that the sole plate 40 projects from the mounting base 16 essentially in the same plane as the mounting base 16. In this manner, the rod holder can be used with rope cleats which are mounted to a vertical surface. The detent will operate in the same manner.

Of course different types and shapes of detents may be used, and a simple push button type of detent would fasten the rod holder in position. However, by using an extended sole plate as shown, a greater contact is maintained with the surface of the boat, thus minimizing the mechanical advantage of an extended fishing rod, which could otherwise generate significant forces tending to pull the mount away from the boat.

While this invention has been described as having certain preferred features and embodiments, it will be understood that it is capable of still further variation and modification without departing from the spirit of the invention, and this application is intended to cover any and all variations, modifications and adaptations of the invention which will become apparent to one or routine skill in the art to which the invention pertains, and which fall within the spirit of the invention and the scope of the appended claims.

I claim:

1. A mounting base for removably securing a base portion of a fishing rod holder to a boat having a rope cleat thereon and comprising a mounting plate for receiving said base portion and a sole plate extending therefrom, said sole plate having means forming a recess therein, a detent member secured in said recess, spring means acting on said sole plate and said detent member so as to cause said detent member to normally project above the surface of said sole plate for securing said sole plate in position beneath said rope cleat while enabling said detent member to be depressed against the urging of said spring beneath the surface of said sole plate and enable withdrawal of said sole plate from beneath said rope cleat.

2. A mounting base as in claim 1 and wherein said detent member comprises an elongated member pivotally mounted to said sole plate.

3. A mounting base as in claim 2 and wherein said spring means comprises a coil spring mounted in opposed recesses in said sole plate and said detent member.

4. A mounting base as in claim 2 and wherein said sole plate is essentially coplanar with said mounting plate.

5. A mounting base as in claim 2 and wherein said sole plate is perpendicular to said mounting plate.

6. A mounting base as in claim 2 in combination with a rope cleat secured to the deck of a boat.

7. A fishing rod holder device for use with a boat and including a mounting base for removably securing a rod holder base portion to a rope cleat mounted on a deck surface of said boat, said device comprising a mounting plate for receiving said base portion and a sole plate extending therefrom, said sole plate having a projecting detent member therein, spring means acting on said detent member so as to cause said detent member to normally project above the surface of said sole plate for securing said sole plate in position beneath said rope cleat while enabling said detent member to be depressed against the urging of said spring beneath the surface of said sole plate and enable withdrawal of said sole plate from beneath said rope cleat.

\* \* \* \* \*